United States Patent
Manos, Jr.

(10) Patent No.: US 6,705,809 B2
(45) Date of Patent: Mar. 16, 2004

(54) DRILL PRESS TABLE

(76) Inventor: James T. Manos, Jr., 2711 Race Ave., Pittsburgh, PA (US) 15235

( * ) Notice: Subject to any disclaimer, the term of this patent is extended or adjusted under 35 U.S.C. 154(b) by 119 days.

(21) Appl. No.: 10/058,653

(22) Filed: Jan. 28, 2002

(65) Prior Publication Data

US 2003/0147710 A1 Aug. 7, 2003

(51) Int. Cl.⁷ .............................................. B23B 47/00
(52) U.S. Cl. .............................. 408/89; 408/234; 108/6
(58) Field of Search .......................... 408/87–89, 91, 408/234; 269/309; 108/6, 8; 451/414; 83/810

(56) References Cited

U.S. PATENT DOCUMENTS

| | | | |
|---|---|---|---|
| 2,903,027 A | * | 9/1959 | Edgemond, Jr. et al. ...... 83/810 |
| 5,634,748 A | | 6/1997 | Brazell et al. |
| 5,765,273 A | | 6/1998 | Mora et al. |
| 5,924,827 A | | 7/1999 | Mora et al. |
| 5,960,531 A | | 10/1999 | Mora et al. |
| 5,980,167 A | | 11/1999 | Chen |

* cited by examiner

Primary Examiner—Daniel W. Howell
(74) Attorney, Agent, or Firm—The Webb Law Firm

(57) ABSTRACT

A drill press table includes a drill table having a pivot element on one end of the drill table, and a support member having a bracket with at least one bracket recess. The drill table is mounted to the support member such that the pivot element is rotatably engaged with the bracket. The pivot element includes a pivot element plate with an arcuate slot that received a bolt. A locking mechanism extends through the pivot element plate, and removably secures the pivot element to the support member bracket. Ends of the arcuate slot, in cooperation with the bolt provide positive stops at extreme tiltable positions of the drill table at 90° and 45° from horizontal. The drill press table also includes a detent mechanism, which at least partially engages with the bracket recess, thereby indicating a desired position.

28 Claims, 4 Drawing Sheets

DRILL PRESS TABLE

BACKGROUND OF THE INVENTION

1. Field of the Invention

The present invention relates generally to drill press machines, and, in particular, to pivotable drill press tables.

2. Brief Description of the Prior Art

Drill presses are used in many industries for constructing articles of manufacture, as well as intermediate products. A typical drill press has a drill press table attached to a support member, which, in turn, is secured to the floor of a shop. Above the drill press table is a drill, saw or other tool which is controllable to drill or cut material placed on the drill press table. A drill press of rigid construction having no flexibility yields only one specific straight-line bore through a piece.

In order to provide additional flexibility in drilling and cutting materials, drill presses with tiltable tables have been developed. For example, U.S. Pat. Nos. 5,765,273 and 5,924,827, both to Mora et al., disclose a drill press having a pivotable table. However, the pivotable tables in both of these patents are complex mechanisms with a limited range of movement. Similarly, U.S. Pat. No. 5,960,531 to Mora et al. discloses a similarly limited tiltable drill press table. Another example of a drill press having a tiltable or pivotable table is found in U.S. Pat. No. 5,634,748 to Brazell et al., which discloses a pivotable table with a limited range of table movement and positioning.

While pivotable tables are known in the art, the prior art drill presses with pivotable tables allow for only a limited range of movement. Further, such drill presses lack positive adjustable stops at the typically desired table angles.

SUMMARY OF THE INVENTION

It is therefore an object of the present invention to provide a drill press table that overcomes the deficiencies of the prior art. It is another object of the present invention to provide a drill press with a pivotable table, which has a full and flexible range of movement about a horizontal axis. It is a further object of the present invention to provide a drill press with a pivotable table that has positive adjustable stops at desired table angles.

The present invention is a drill press table having a pivot element on one end of the table. The drill table is mounted to a support member via the pivot element rotatably engaged with a support member bracket. The bracket has at least one bracket recess. The pivot element includes a pivot element plate with a locking mechanism extending through the pivot element plate for removably securing the pivot element to the support member bracket. A bolt is received in an arcuate slot in the pivot element plate so that the ends of the arcuate slot provide positive stops at extreme tiltable positions of the drill table at 90° and 45° from horizontal. Finally, the pivot element includes a detent mechanism, which at least partially engages with the bracket recess for indicating a desired position.

In another embodiment, the present invention is a drill press table including a support member having a bracket with a plurality of bracket recesses. At least one of the plurality of bracket recesses corresponds to an extreme tiltable position of the drill table, and the drill table is pivotally connected to the support member bracket. A pivot element plate is connected with the drill table, and a detent mechanism is connected to the pivot element plate. This detent mechanism at least partially engages with the plurality of bracket recesses, thereby indicating a desired position and providing a positive stop at the extreme tiltable position of the drill table.

The present invention, both as to its construction and its method of operation, together with additional objects and advantages thereof, will best be understood from the following description of specific embodiments when read in connection with the accompanying drawings.

DETAILED DESCRIPTION OF THE PREFERRED EMBODIMENTS

Figure 1:
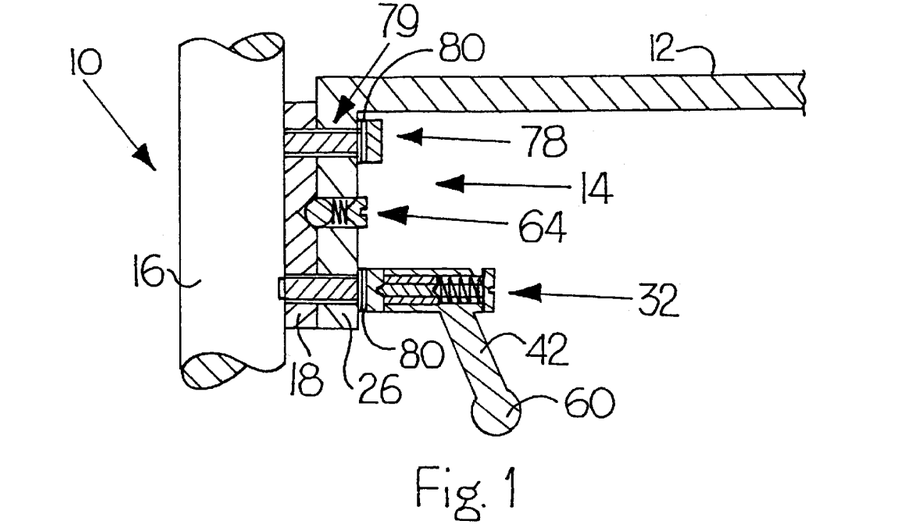
FIG. 1 is a side sectional view of a first embodiment of a drill press table according to the present invention.
Figure 2:
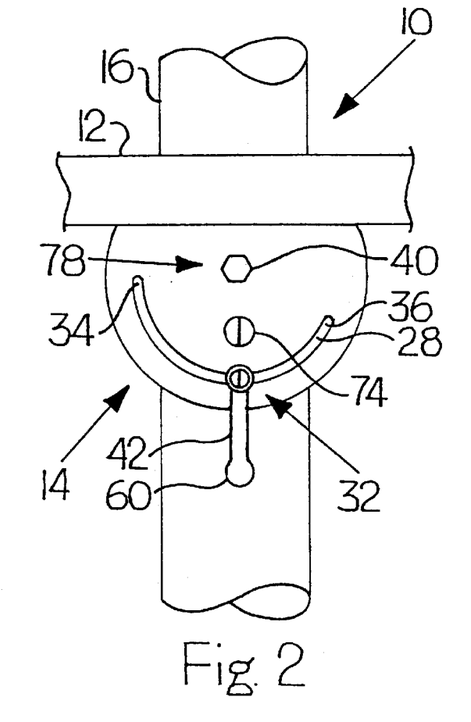
FIG. 2 is a front view of the drill press table of FIG. 1.
Figure 3:
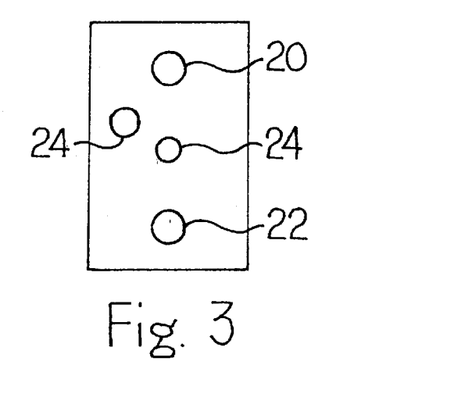
FIG. 3 is a front view of a support member bracket according to the present invention.

A first embodiment of a drill press table 10 of the present invention is generally shown in FIGS. 1 and 2. The drill press table 10 includes a drill table 12 upon which a user can drill or cut articles utilizing a drill or saw (not shown). On one end of the drill table 12 is a pivot element 14. This pivot element 14 may be attached to the drill table 12 or integrally formed with the drill table 12. The drill press table 10 also includes a support member 16 with a support member bracket 18 attached thereto. The bracket 18 may be either attached to or integrally formed with the support member 16. The bracket 18 has a first bracket orifice 20 and a second bracket orifice 22, both extending through the bracket 18, as seen in FIG. 3. In addition, the bracket 18 has at least one bracket recess 24. The drill table 12 is rotatably mounted to the support member 16, since pivot element 14 is rotatably engaged with the bracket 18.

Figure 4:
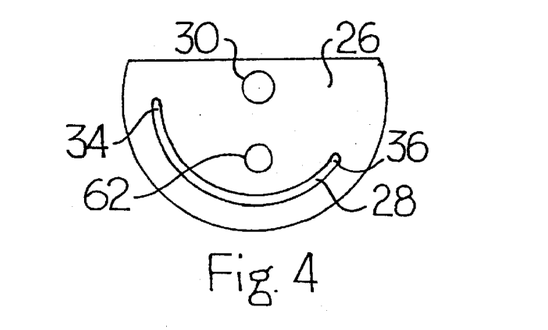
FIG. 4 is a front view of a pivot element plate according to the present invention.

The pivot element 14 includes a pivot element plate 26. The pivot element plate 26 has an arcuate slot 28 and a pivot element central pivot orifice 30. The pivot element central pivot orifice 30 is constructed so as to align with the first bracket orifice 20. The pivot element 14 also includes an arcuate slot locking mechanism 32 extending through the arcuate slot 28. The arcuate slot locking mechanism 32 removably secures the pivot element 14 to the support member bracket 18. Further, the arcuate slot 28 has an arcuate slot first end 34 and an arcuate slot second end 36, which provide positive stops at extreme tiltable positions of the drill table 12, specifically at 90° (from horizontal) at the arcuate slot first end 34 and 45° (from horizontal) at the arcuate slot second end 36.

Figure 11:
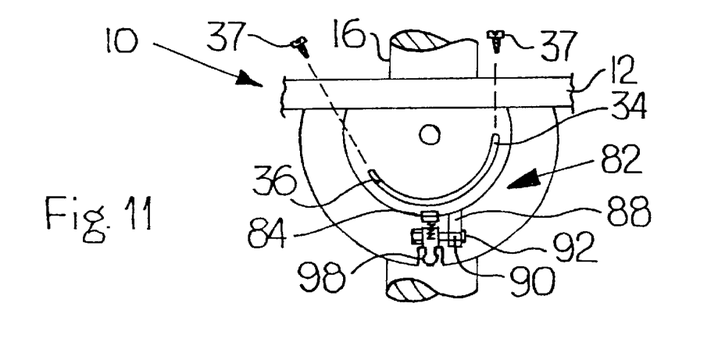
FIG. 11 is a front view of the drill press table of FIG. 10.

As seen in FIG. 11, the extreme tiltable positions of the drill table 12 may be adjusted using set screws 37. Specifically, these set screws may mate with orifices (not shown) which are aligned with the arcuate slot first end 34 and the arcuate slot second end 36. When engaged, these set screws 37 can be further engaged or disengaged with their respective orifices, with ends of the set screws providing the positive stops at the arcuate slot first end 34 and the arcuate slot second end 36. In using these set screws 37, the extreme tiltable positions of the table become adjustable, allowing correction for machining, desired position modifications, etc.

Figures 5, 6, 7, 9:
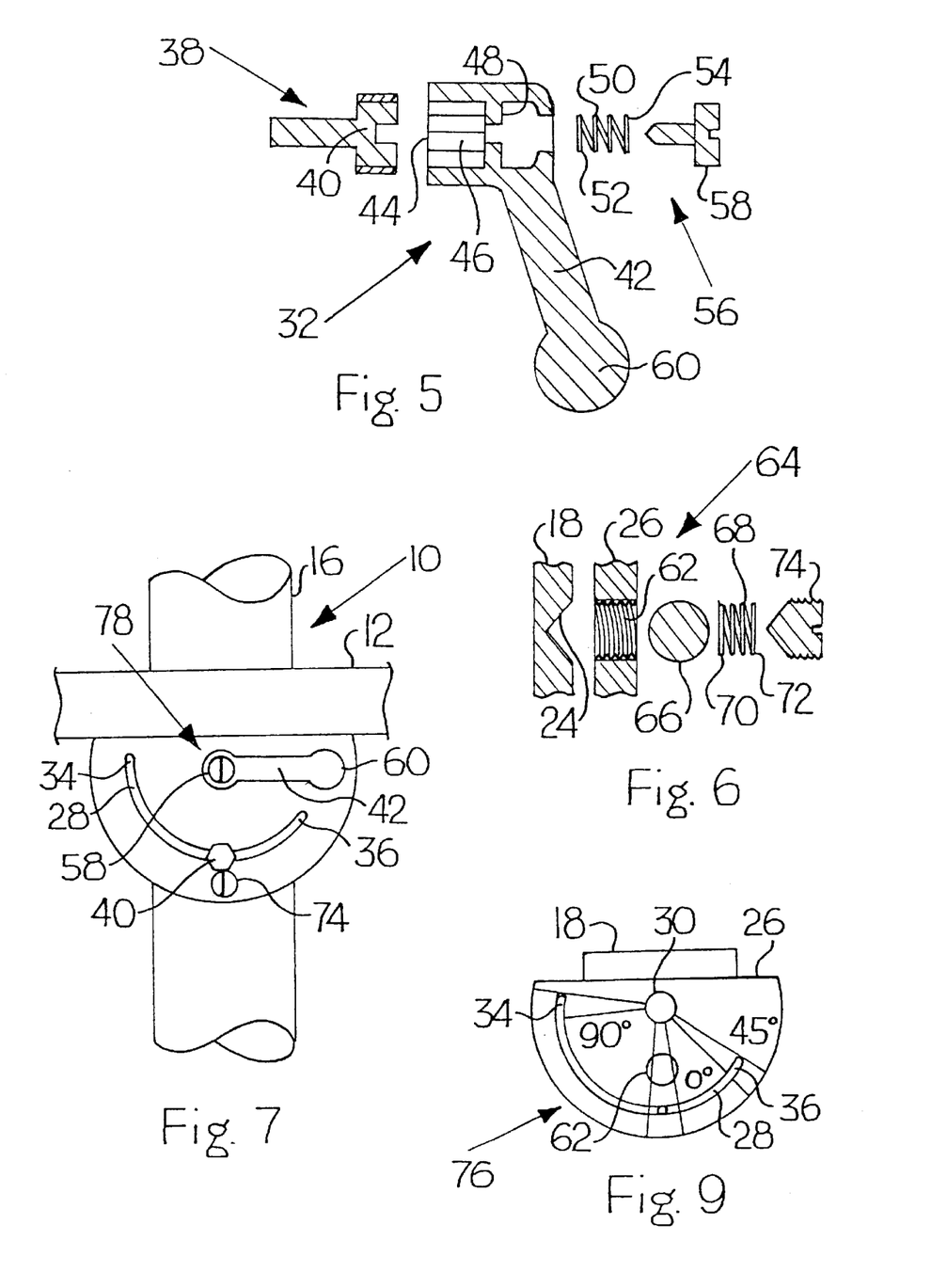
FIG. 5 is a side exploded sectional view of an arcuate slot locking mechanism according to the present invention.
FIG. 6 is a side exploded sectional view of a detent mechanism according to the present invention.
FIG. 7 is a front view of a second embodiment of a drill press table according to the present invention.
FIG. 9 is a front view of a scale element according to the present invention.

As seen in FIGS. 1, 2 and 5, in the first embodiment, the arcuate slot locking mechanism 32 may include a locking bolt 38 with a locking bolt head portion 40 having an outer surface with grooves disposed thereon. It is also envisioned that the locking bolt 38 may have a separate head portion attached to or integrally formed with a second locking bolt head portion 40 with grooves disposed thereon. Still further, it is envisioned that a grooved element may be slid over or engaged with a typical locking bolt 38 head. For example, the locking bolt head portion 40 may have a bore with inside walls for removably engaging it to a typical locking bolt head, such as a hexagonal-shaped bolt head. The necessary aspect of the arrangement is that when the locking bolt head portion 40 with grooves is rotated, the locking bolt 38 is likewise rotated. Such rotation of the locking bolt 38 removably attaches the pivot element 14 to the bracket 18 via the arcuate slot 28 and the second bracket orifice 22, in a clamping fashion. In order to accomplish this secure arrangement, the locking bolt head portion 40 may have a width greater than the width of the arcuate slot 28.

The arcuate slot locking mechanism 32 also includes a handle element 42. The handle element 42 has a handle element bore 44, which has bore inside walls 46 with splines disposed thereon. These handle element 42 splines are configured to mate with the locking bolt head portion 40 grooves, such that, when the handle element 42 is rotated, the locking bolt 38 is likewise rotated.

The handle element bore 44 extends substantially through the handle element 42 and terminates in a handle element ridge 48. In order to allow removable engagement, the handle element 42 also includes a handle element spring 50, with a handle element spring first end 52 and a handle element spring second end 54. The handle element spring first end 52 abuts the handle element ridge 48. The handle element 42 also includes a handle element attachment mechanism 56 having a handle element attachment mechanism head portion 58. The handle element attachment mechanism 56 extends through the handle element spring 50 coils and engages the handle element ridge 48, with the handle element attachment mechanism head portion 58 abutting the handle element spring second end 54.

It is also envisioned that, for enhanced engagement, the handle element attachment mechanism 56 may further engage the locking bolt head portion 40. The handle element spring 50 is compressed when the handle element attachment mechanism 56 is rotated in a first direction, and the handle element spring 50 is uncompressed when the handle element attachment mechanism 56 is rotated in a second direction. When the handle element attachment mechanism 56 is rotated sufficiently in the second direction, the handle element bore 44 splines are disengaged from the locking bolt head portion 40 grooves, thereby allowing free rotation of the handle element 42. In order to assist a user in rotating the handle element 42, the handle element 42 may also include a handle projection 60. A user may simply grasp this handle projection 60, rotate the handle element 42, and, in turn, rotate the locking bolt 38.

As seen in FIG. 6, the pivot element plate 26 includes a pivot element detent orifice 62. A detent mechanism 64 extends at least partially through the pivot element detent orifice 62. In this embodiment, the detent mechanism 64 includes a detent ball 66, which is sized to engage the bracket recess 24. Further, the detent mechanism 64 has a detent spring 68, the detent spring 68 having a detent spring first end 70 and detent spring second end 72. The detent spring first end 70 abuts the detent ball 66. The detent mechanism 64 also includes a detent set mechanism 74, and the detent spring second end 72 abuts the detent set mechanism 74. When the detent set mechanism 74 is engaged with the pivot element detent orifice 62, the detent set mechanism 74 compresses the detent spring 68, thereby forcing the detent ball 66 to engage the bracket recess 24.

It is envisioned that the bracket recess 24 may correspond to a 0° (i.e., true horizontal) position of the drill table 12. In addition, there may be multiple bracket recesses 24, corresponding to typical desired angles, such as 45° and 90° from the horizontal. In order to further assist a user in visually indicating the tiltable position of the drill table 12, a scale element 76 may be utilized. As seen in FIG. 9, the scale element 76 provides visual indication of specific and desired angles, regardless of whether the specific angles correspond to a bracket recess 24.

It is also envisioned that the pivot element 14 includes a pivot locking mechanism 78 to secure the pivot element 14 to the bracket 18. Specifically, the pivot locking mechanism 78 includes a locking bolt 79, which extends through the pivot element central pivot orifice 30 and further through the first bracket orifice 20. It is also envisioned that the handle element 42 and locking bolt 38 arrangement as described hereinabove in connection with the arcuate slot locking mechanism 32 may also be used as the pivot locking mechanism 78. In addition, this handle element 42 and locking bolt 38 arrangement may be used with any locking bolt 38 and 79 and an associated orifice or orifices. When simply using the locking bolt 79, not in connection with the handle element 42, the locking bolt head portion need not have any grooves disposed on its outer surface. Instead, typically a user would use a wrench or other tool to tighten and loosen the locking bolt 79. Still further, it is envisioned that both the pivot locking mechanism 78, as well as the arcuate slot locking mechanism 32, may use the locking bolt 38 and handle element 42 arrangement concurrently.

Figure 8:
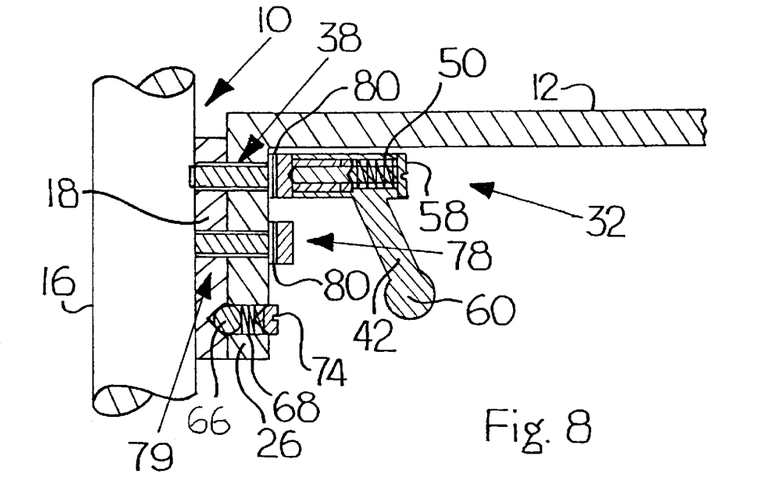
FIG. 8 is a side sectional view of the drill press table of FIG. 7.

A second embodiment of the present invention is illustrated in FIGS. 7 and 8. In this embodiment, it is the pivot locking mechanism 78 that uses the locking bolt 38 and handle element 42 arrangement. In addition, the detent mechanism 64 is located further from the pivot element central pivot orifice 30 on the other side of the arcuate slot 28. This arrangement would allow for the use of more bracket recesses 24, thereby allowing greater flexibility in providing a user with set indicator positions.

Since the arcuate slot terminates at 90° from horizontal at the arcuate slot first end 34 and 45° from horizontal at the arcuate slot second end 36, when the drill table 12 is pivoted, the drill table 12 necessarily stops at these end points or, when using the set screws 37, at the ends of the adjustable set screws. This provides the user with positive, yet adjustable, stops at the two typically desired positions of the drill table 12.

Figure 10:
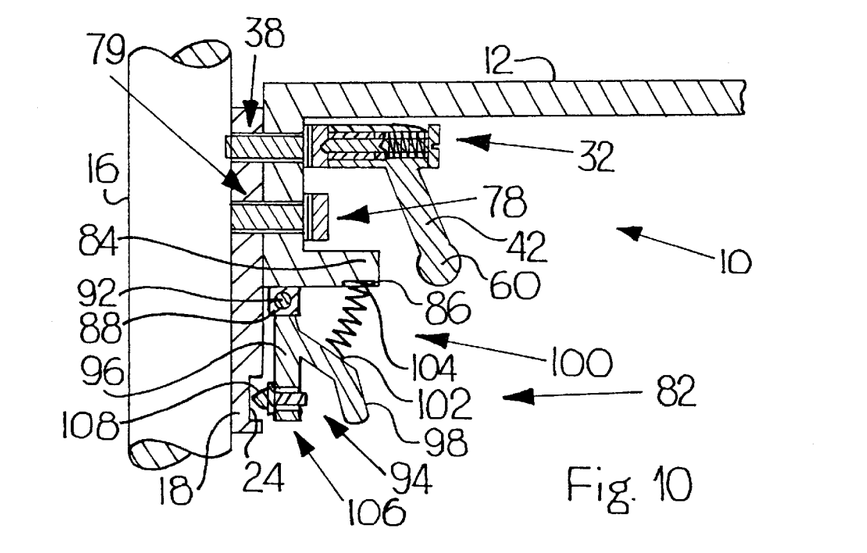
FIG. 10 is a side sectional view of a third embodiment of a drill press table according to the present invention.

A third embodiment of the present invention is shown in FIGS. 10 and 11. In this embodiment, as with the second embodiment, the pivot locking mechanism 78 uses the locking bolt 38 and handle element 42 arrangement. In addition, the bracket recess 24 is located towards the bottom of the bracket 18. However, in this embodiment, the pivot element plate 26 does not include a pivot element detent orifice 62. Instead, the detent mechanism 64 is a trigger mechanism 82. Further, the pivot element plate 26 includes a spring projection element 84 having a spring recess 86 and a pivot projection element 88 having a pivot recess 90.

The trigger mechanism 82 includes a pivot bolt 92 secured to a trigger handle 94 having a trigger handle first end 96 and a trigger handle second end 98. The pivot bolt 92 pivotally attaches the trigger handle first end 96 to the pivot projection element 88 via the pivot recess 90. A trigger spring 100, having a trigger spring first end 102 and a trigger spring second end 104, is located towards the trigger handle second end 98. Specifically, the trigger spring first end 102 is rigidly attached to the trigger handle second end 98, and the trigger spring second end 104 is engaged with the spring projection element 84, at least partially within the spring recess 86. When the trigger handle second end 98 is moved away from the bracket 18, the trigger spring 100 is compressed, and when the trigger handle second end 98 is released, the trigger spring 100 pushes the trigger handle second end 98 back towards the bracket 18.

As best seen in FIG. 10, the trigger mechanism 82 also includes a detent end 106 having a detent head 108. The detent head 108 may be beveled so as to allow adjustable engagement with the bracket recess 24. The detent head 108 is engageable and disengageable with the bracket recess 24 in conjunction with the above-described trigger handle second end 98 movement. When the trigger mechanism 82 is disengaged, and the pivot element 14 may be pivoted, and the detent head 108 moves along the bracket 18 surface until reaching a subsequent bracket recess 24. When the original or subsequent bracket recess 24 is encountered, the trigger spring 100 urges the trigger handle second end 98 towards the bracket 18, thereby urging the detent head 108 to at least partially engage the bracket recess 24. This creates a stop or set position.

In operation and starting from a horizontal position, the user should loosen one or both of the pivot locking mechanism 78 and the arcuate slot locking mechanism 32. This may be accomplished using a wrench or, if a handle element 42 and locking bolt 38 arrangement is provided, merely a rotation of the handle element 42. If, when the handle projection 60 is rotated it abuts or contacts an underside of the drill table 12, a user may simply loosen the handle element attachment mechanism 56, disengage the handle element bore 44 grooves from the locking bolt head portion 40 grooves, reverse-rotate the handle projection 60, re-engage the handle element bore 44 grooves with the locking bolt head portion 40 grooves, and continue rotation. Simply, this arrangement allows for a quick release and engagement mechanism for rotating the locking bolt 38.

Once the pivot locking mechanism 78 and the arcuate slot locking mechanism 32 are appropriately loosened, the drill table 12 is pivoted to its desired angle. When the drill table 12 is at a desired angle, the pivot locking mechanism 78 and the arcuate slot locking mechanism 32 are re-engaged or tightened, thereby securing the drill table 12 at the desired angle. The detent mechanism 64 provides the user with predetermined sets at certain desired positions. Not only may the user hear the detent ball 66 or detent head 108 engage the bracket recess 24, the engagement of the detent ball 66 or detent head 108 with the bracket recess 24 provides enough friction so as to alert the user that the position has been attained. Of course, if the position desired does not correspond with a bracket recess 24, the user may refer to the scale element 76 to set the angle. In order to further enhance the engagement, one or both of the pivot locking mechanism 78 and the arcuate slot locking mechanism 32 may use one or more washers 80. These washers will be placed between an underside of the locking bolt head portion 40 and a face of the pivot element plate 26.

Figure 12:
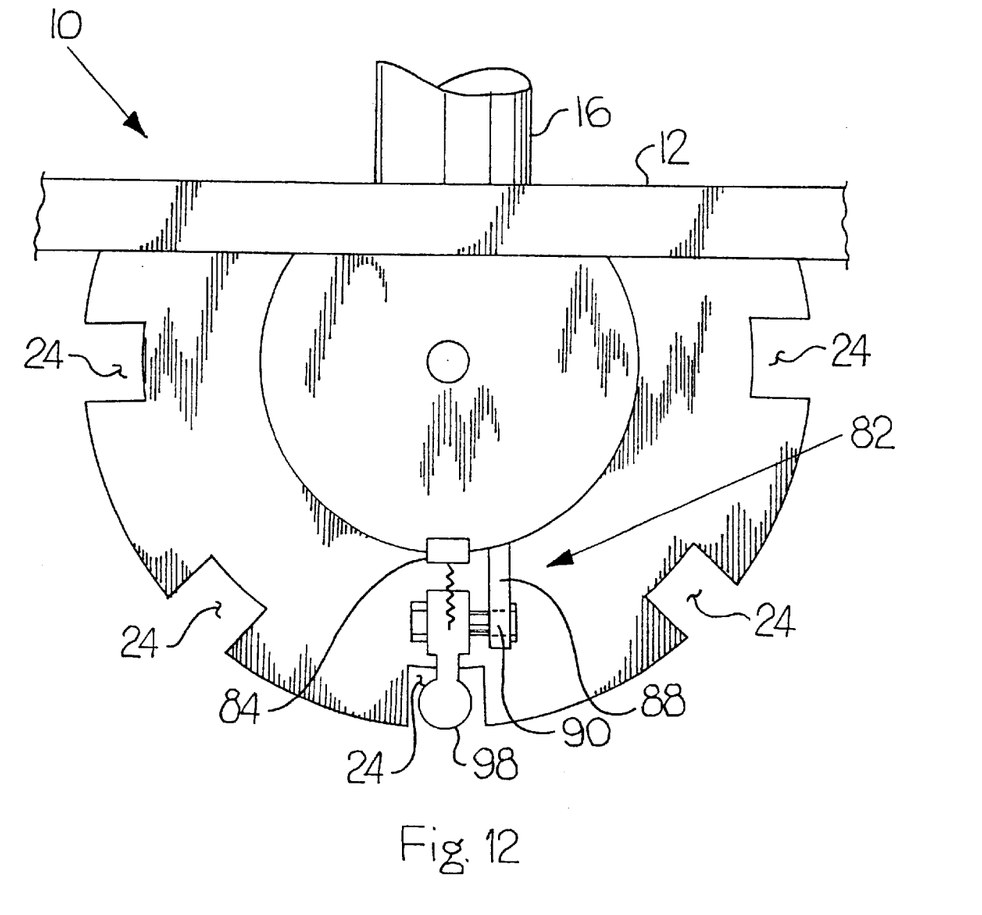
FIG. 12 is a front view of a fourth embodiment of a drill press table according to the present invention.

FIG. 12 illustrates a fourth embodiment of the present invention. This embodiment uses the trigger mechanism 82, which uses the detent head 108 to engage with a bracket recess 24. Further, as seen in FIG. 12, this embodiment uses multiple bracket recesses 24. As opposed to using the arcuate slot 36, together with the locking mechanism 32, to lock and prevent tilting of the drill table 12, the trigger mechanism 82, in conjunction with the multiple bracket recesses 24, is used to hold the drill table 12 in place. Specifically, five bracket recesses 24 are shown and used in FIG. 12, the bracket recesses 24 corresponding to the typical desired angles of 0°, 45° and 90° from horizontal. In essence, it is the detent mechanism 64 or trigger mechanism 82, which acts as the locking mechanism 32 to lock the drill table 12 in place.

In operation, since the detent head 108 is engageable and disengeagable with the bracket recesses 24, in conjunction with the above-described trigger handle second end 98 movement, when the trigger mechanism 82 is disengaged, and the pivot element 14 is pivoted, the detent head 108 moves along the bracket 18 surface until reaching a subsequent bracket recess 24. When the original or subsequent bracket recess 24 is encountered, the trigger spring urges the trigger handle second end 98 towards the bracket 18, thereby urging the detent head to at least partially engage the bracket recess 24. This creates a stop or set position. Since there are bracket recesses 24 at the 90° positions, with respect to the horizontal, the combination of the trigger mechanism 82 and bracket recesses 24 create positive stops at the extreme tiltable positions of the drill table 12. Therefore, the present embodiment requires neither the above-described arcuate slot 36 nor the locking mechanism 32 described in the previous embodiments.

However farther securement of the drill press table may be achieved by using the locking mechanism 32 shown and described above. It is envisioned that any number of bracket recesses 24 may be utilized, which would provide many and discrete stop and lock positions of the drill table 12.

In this manner, the drill press table 10 has a pivotable drill table 12 with a fall range of movement. In addition, the drill press table 10 allows for positive adjustable stops at the extreme tiltable positions of the drill table 12 at 90° and 45° from horizontal. Further, the drill press table 10 is simple in its construction, yet provides a flexible range of movement.

This invention has been described with reference to the preferred embodiments. Obvious modifications and alterations will occur to others upon reading and understanding the preceding detailed description. It is intended that the invention be construed as including all such modifications and alterations.

I claim:

1. A drill press table, comprising:
   a support member having a bracket with at least one bracket recess;
   a drill table pivotally connected to the support member bracket;

a pivot element plate connected with the drill table, the pivot element plate having an arcuate slot;

a locking mechanism extending through the pivot element plate to removably secure the pivot element plate to the support member bracket;

a bolt received in the arcuate slot, so that ends of the arcuate slot provide positive stops at extreme tiltable positions of the drill table; and a detent mechanism configured to at least partially engage with the at least one bracket recess, thereby indicating a desired position of the drill table;

wherein the locking mechanism is received through an orifice in the pivot element plate which is spaced from the arcuate slot, the locking mechanism further comprising:

a locking bolt having an outer surface: and a handle element with a bore having inside walls with grooves disposed thereon, the handle element bore grooves configured to mate with at least a portion of the outer surface of the locking bolt, such that, when the handle element is rotated, the handle element bore grooves contact the locking bolt, thereby rotating the locking bolt.

2. A drill press table, comprising:

a support member having a bracket with at least one bracket recess;

a drill table pivotally connected to the support member bracket;

a pivot element plate connected with the drill table, the pivot element plate having an arcuate slot;

a locking mechanism extending through the pivot element plate to removably secure the pivot element plate to the support member bracket;

a bolt received in the arcuate slot, so that ends of the arcuate slot provide positive stops at extreme tiltable positions of the drill table;

a detent mechanism configured to at least partially engage with the at least one bracket recess, thereby indicating a desired position of the drill table; and at least one set screw engaged with a set screw orifice positioned adjacent at least one end of the arcuate slot, such that, when the set screw is rotated in a first direction, the set screw further engages the set screw orifice, thereby providing an adjustable stop position at an end of the set screw.

3. The drill press table of claim 1, wherein the locking bolt has a head portion with a bore having inside walls configured to removably engage a locking bolt head, such that, when the locking bolt head portion is rotated, the locking bolt head and the locking bolt are rotated.

4. The drill press table of claim 1, wherein the locking bolt has a head portion that is integrally formed with the locking bolt.

5. The drill press table of claim 1, wherein the handle element bore extends substantially through the handle element, terminating in a handle element ridge.

6. The drill press table of claim 5, wherein the handle element further comprises:

a handle element spring having two ends, the first end configured to abut the handle element ridge; and a handle element attachment mechanism having a head portion, extending through the handle element spring coils and engaging the handle element ridge, the handle element attachment mechanism head portion abutting the second end of the spring;

wherein the handle element spring is compressed when the handle element attachment mechanism is rotated in a first direction and uncompressed when the handle element attachment mechanism is rotated in a second direction; and wherein, when the handle element attachment mechanism is rotated sufficiently in the second direction, the handle element bore grooves are disengaged from the locking bolt, thereby allowing free rotation of the handle element.

7. The drill press table of claim 1, wherein the handle element further comprises a handle projection configured to be graspable by a user to assist in rotation of the handle element.

8. The drill press table of claim 1, wherein the pivot element plate further comprises a pivot element detent orifice, wherein the detent mechanism extends through the pivot element detent orifice, the detent mechanism comprising:

a detent ball sized to at least partially engage the at least one bracket recess;

a detent spring having two ends, the first end of the detent spring abutting the detent ball; and a detent set mechanism abutting the second end of the detent spring;

wherein, when the detent set mechanism is engaged with the pivot element detent orifice, the detent set mechanism compresses the detent spring, thereby allowing the detent ball to engage the at least one bracket recess.

9. The drill press table of claim 1, wherein the pivot element plate includes a spring projection element having a spring recess and a pivot projection element having a pivot recess, wherein the detent mechanism comprises:

a pivot bolt secured to a trigger handle having a trigger handle first end, a trigger handle second end and a detent end having a detent head, wherein the pivot bolt pivotally attaches the trigger handle first end to the pivot projection element via the pivot recess; and a trigger spring, having a trigger spring first end rigidly attached to the trigger handle second end and a trigger spring second end engaged with the spring projection element, at least partially within the spring recess;

wherein, when the trigger handle second end is moved away from the bracket, the trigger spring is compressed, and when the trigger handle second end is released, the trigger spring urges the trigger handle second end back towards the bracket;

wherein the detent head is disengaged from the bracket recess when the trigger handle second end is moved away from the bracket.

10. The drill press table of claim 1, wherein the at least one bracket recess corresponds to a tiltable position of the drill table of one of 0°, 45° and 90° from the horizontal.

11. The drill press table of claim 1, further comprising a plurality of bracket recesses.

12. The drill press table of claim 1, further comprising a scale element configured to visually indicate the tiltable position of the drill table to a user.

13. The drill press table of claim 1, further comprising at least one set screw engaged with a set screw orifice positioned adjacent at least one end of the arcuate slot, such that, when the set screw is rotated in a first direction, the set screw further engages the set screw orifice, thereby providing an adjustable stop position at an end of the set screw.

14. The drill press table of claim 13, wherein the arcuate slot has an arcuate slot first end and an arcuate slot second end, the drill press table further comprising two set screws, each engaged with a respective set screw orifice positioned adjacent the arcuate slot first end and the arcuate slot second end, such that, when the set screw is rotated in a first direction, the set screw further engages the set screw orifice, thereby providing an adjustable stop position at an end of the set screw.

15. The drill press table of claim 1, wherein the locking mechanism extends through the arcuate slot in the pivot element plate and further extends into a bracket orifice on the bracket, the locking mechanism including the bolt received in the arcuate slot and further configured to removably secure the pivot element plate to the bracket.

16. The drill press table of claim 15, wherein the locking mechanism comprises:
  a locking bolt with a head portion having an outer surface with grooves disposed thereon; and
  a handle element with a bore having inside walls with grooves disposed thereon, the handle element bore grooves configured to mate with the locking bolt head portion grooves, such that, when the handle element is rotated, the handle element bore grooves contact the locking bolt head portion grooves, thereby rotating the locking bolt.

17. The drill press table of claim 16, wherein the locking bolt head portion has a bore having inside walls configured to removably engage a locking bolt head, such that, when the locking bolt head portion is rotated, the locking bolt head and locking bolt are rotated.

18. The drill press table of claim 16, wherein the handle element bore extends substantially through the handle element, terminating in a handle element ridge.

19. The drill press table of claim 18, wherein the handle element further comprises:
  a handle element spring having two ends, the first end configured to abut the handle element ridge; and
  a handle element attachment mechanism having a head portion, extending through handle element spring coils and engaging the handle element ridge, the handle element attachment mechanism head portion abutting the second end of the spring;
  wherein the handle element spring is compressed when the handle element attachment mechanism is rotated in a first direction and uncompressed when the handle element attachment mechanism is rotated in a second direction; and
  wherein, when the handle element attachment mechanism is rotated sufficiently in the second direction, the handle element bore grooves are disengaged from the locking bolt head portion grooves, thereby allowing free rotation of the handle element.

20. The drill press table of claim 15, further comprising at least one washer between the locking mechanism and a face of the pivot element plate.

21. The drill press table of claim 1, wherein the bracket is integrally formed with the base member.

22. The drill press table of claim 1, wherein in addition to the locking mechanism, the bolt in the arcuate slot is also configured to lock the pivot element plate against rotation with respect to the bracket.

23. A drill press table, comprising:
  a support member having a bracket with a plurality of bracket recesses, wherein at least one of the plurality of bracket recesses corresponds to an extreme tiltable position of the drill table;
  a drill table pivotally connected to the support member bracket;
  a pivot element plate connected with the drill table;
  a detent mechanism connected to the pivot element plate and configured to at least partially engage with the plurality of bracket recesses, thereby indicating a desired position and thereby providing a positive stop at the extreme tiltable position of the drill table; and
  a locking mechanism extending through the pivot element plate to removably secure the pivot element plate to the support member bracket;
  wherein the locking mechanism is received through an orifice in the pivot element plate, the locking mechanism further comprising:
    a locking bolt with a head portion having an outer surface; and
    a handle element with a bore having inside walls with grooves disposed thereon, the handle element bore grooves configured to mate with a portion of the outer surface of the locking bolt head, such that, when the handle element is rotated, the handle element bore grooves contact the locking bolt head portion, thereby rotating the locking bolt.

24. A drill press table, comprising:
  a support member having a bracket with at least one bracket recess;
  a drill table pivotally connected to the support member bracket;
  a pivot element plate connected with the drill table, the pivot element plate having an arcuate slot;
  a locking mechanism extending through the pivot element plate to removably secure the pivot element plate to the support member bracket;
  a bolt received in the arcuate slot, so that ends of the arcuate slot provide positive stops at extreme tiltable positions of the drill table; and
  a detent mechanism configured to at least partially engage with the at least one bracket recess, thereby indicating a desired position of the drill table;
  wherein the pivot element plate includes a spring projection element having a spring recess and a pivot projection element having a pivot recess, wherein the detent mechanism comprises:
    a pivot bolt secured to a trigger handle having a trigger handle first end, a trigger handle second end and a detent end having a detent head, wherein the pivot bolt pivotally attaches the trigger handle first end to the pivot projection element via the pivot recess; and
    a trigger spring, having a trigger spring first end rigidly attached to the trigger handle second end and a trigger spring second end engaged with the spring projection element, at least partially within the spring recess;
    wherein, when the trigger handle second end is moved away from the bracket, the trigger spring is compressed, and when the trigger handle second end is released, the trigger spring urges the trigger handle second end back towards the bracket;
    wherein the detent head is disengaged from the bracket recess when the trigger handle second end is moved away from the bracket.

25. A drill press table, comprising:
  a support member having a bracket with at least one bracket recess;
  a drill table pivotally connected to the support member bracket;
  a pivot element plate connected with the drill table, the pivot element plate having an arcuate slot;

a locking mechanism extending through the pivot element plate to removably secure the pivot element plate to the support member bracket;

a bolt received in the arcuate slot, so that ends of the arcuate slot provide positive stops at extreme tiltable positions of the drill table; and a detent mechanism configured to at least partially engage with the at least one bracket recess, thereby indicating a desired position of the drill table, wherein the pivot element plate comprises a pivot element detent orifice, wherein the detent mechanism extends through the pivot element detent orifice, the detent mechanism comprising:

a detent ball sized to at least partially engage the at least one bracket recess;

a detent spring having two ends, the first end of the detent spring abutting the detent ball; and a detent set mechanism abutting the second end of the detent spring;

wherein, when the detent set mechanism is engaged with the pivot element detent orifice, the detent set mechanism compresses the detent spring, thereby allowing the detent ball to engage the at least one bracket recess.

26. The drill press table of claim 23, wherein the pivot element plate includes a spring projection element having a spring recess and a pivot projection element having a pivot recess, wherein the detent mechanism comprises:

a pivot bolt secured to a trigger handle having a trigger handle first end, a trigger handle second end and a detent end having a detent head, wherein the pivot bolt pivotally attaches the trigger handle first end to the pivot projection element via the pivot recess; and a trigger spring, having a trigger spring first end rigidly attached to the trigger handle second end and a trigger spring second end engaged with the spring projection element, at least partially within the spring recess;

wherein, when the trigger handle second end is moved away from the bracket, the trigger spring is compressed, and when the trigger handle second end is released, the trigger spring urges the trigger handle second end back towards the bracket; and wherein the detent head is disengaged from one of the plurality of bracket recesses when the trigger handle second end is moved away from the bracket.

27. The drill press table of claim 23, wherein the plurality of bracket recesses correspond to tiltable positions of the drill table at 0°, 45° and 90° from horizontal.

28. The drill press table of claim 23, further comprising a scale element configured to visually indicate the tiltable position of the drill table to a user.

* * * * *